(12) United States Patent
Nguyen et al.

(10) Patent No.: US 9,697,302 B2
(45) Date of Patent: Jul. 4, 2017

(54) ELECTRONIC LOCK HAVING AUTOMATIC USER SLOT ASSIGNMENT FOR PASSCODES

(71) Applicant: KWIKSET CORPORATION, Lake Forest, CA (US)

(72) Inventors: Thuan Duy Nguyen, Aliso Viejo, CA (US); Ken Ching Ying Yeh, Lake Forest, CA (US)

(73) Assignee: Spectrum Brands, Inc., Middleton, WI (US)

( * ) Notice: Subject to any disclaimer, the term of this patent is extended or adjusted under 35 U.S.C. 154(b) by 224 days.

(21) Appl. No.: 14/517,178

(22) Filed: Oct. 17, 2014

(65) Prior Publication Data

US 2015/0135307 A1 May 14, 2015

Related U.S. Application Data

(60) Provisional application No. 61/902,250, filed on Nov. 10, 2013.

(51) Int. Cl.
*G06F 21/31* (2013.01)
*G06F 17/30* (2006.01)
*E05B 47/00* (2006.01)
*G07C 9/00* (2006.01)

(52) U.S. Cl.
CPC ........ *G06F 17/30985* (2013.01); *E05B 47/00* (2013.01); *G07C 9/0069* (2013.01); *G07C 2009/00833* (2013.01)

(58) Field of Classification Search
None
See application file for complete search history.

(56) References Cited

U.S. PATENT DOCUMENTS

| | | | | |
|---|---|---|---|---|
| 5,923,264 A | * | 7/1999 | Lavelle | G07C 9/00015 235/375 |
| 9,443,364 B2 | * | 9/2016 | Snider | G07C 9/00174 |
| 2004/0160305 A1 | * | 8/2004 | Remenih | G07C 9/00103 340/5.22 |
| 2010/0283579 A1 | * | 11/2010 | Kraus | G07C 9/00944 340/5.7 |
| 2011/0311052 A1 | * | 12/2011 | Myers | G07C 9/00103 380/270 |
| 2013/0008213 A1 | * | 1/2013 | Brown | E05B 47/00 70/264 |
| 2013/0043973 A1 | * | 2/2013 | Greisen | G07C 9/00571 340/5.51 |

* cited by examiner

*Primary Examiner* — Amir Mehrmanesh
(74) *Attorney, Agent, or Firm* — Barnes & Thornburg LLP

(57) ABSTRACT

An electronic lock in which new passcodes can be added and/or deleted without specifying the user slot to which the new passcode should be assigned. A circuit in the electronic lock determines whether the new passcode to be added is unique compared to existing passcodes stored in memory. If so, the circuit searches for an available user slot for which no authorized passcodes are associated and associates the new passcode with an available user slot.

9 Claims, 7 Drawing Sheets

ELECTRONIC LOCK HAVING AUTOMATIC USER SLOT ASSIGNMENT FOR PASSCODES

RELATED APPLICATIONS

This present application is related to and claims priority to U.S. Provisional Patent Application Ser. No. 61/902,250, filed on Nov. 10, 2013, entitled "Electronic Lock Having Automatic User Slot Assignment for Passcodes." To the extent not included below, the subject matter disclosed in that application is hereby expressly incorporated by reference into the present application in its entirety.

TECHNICAL FIELD

The present invention relates generally to electronic locks, and, more particularly, to an electronic lock having automatic user slot assignment feature when adding/deleting passcodes.

BACKGROUND AND SUMMARY

In some cases, electronic locks can be programmed to unlock with multiple passcodes, which allows a lock to be used by multiple users. Each of the passcodes is typically associated with a user slot (also called a user number) in memory. For example, user slot number 1 could be associated with the passcode "1234" and user slot number 2 could be associated with the passcode "6789." In this example, the electronic lock would unlock if either "1234" or "6789" were entered as the password. With this type of arrangement, it can become necessary to add additional passcodes or delete passcodes depending upon the circumstances. The typical manner of adding and deleting passcodes requires the user slot to be entered. However, this creates a risk that the new passcode will inadvertently overwrite another passcode if the wrong user slot is entered; likewise, the wrong passcode could be deleted if the wrong user slot is entered. Therefore, there is a need for a manner of adding and deleting passcodes without the risk of overwriting or deleting the wrong passcode.

According to one aspect, the invention provides an electronic lock in which a new passcode can be added without specifying the user slot to which the new passcode should be assigned. Instead, in some embodiments, the electronic lock is programmed to automatically assign a user slot to the new passcode. Since the new passcode can be entered without providing a user slot, this prevents the risk of overwriting a passcode if the incorrect user slot is entered by the user.

According to another aspect, the invention provides an electronic lock in which a passcode can be deleted without specifying the user slot to which the passcode to be deleted is associated. Instead, in some embodiments, the electronic lock is programmed to delete the passcode based on the passcode itself without separately entering in the user slot. Since the passcode can be deleted without providing a user slot, this prevents the risk of inadvertently deleting the wrong passcode if the incorrect user slot is entered by the user.

According to a further aspect, the invention provides an electronic lock with a latch assembly including a bolt movable between a locked position and an unlocked position. The lock includes a circuit with at least one input device and memory. The memory has a plurality of user slots stored thereon that are capable of being associated with an authorized passcode. The circuit is configured to control movement of the bolt from the locked position to the unlocked position responsive to receiving an authorized passcode via the input device. There is an add mode and a delete mode that the circuit can enter into based on input from the input device. In the add mode, the circuit is configured to add a new passcode to memory without specifying a user slot. In the delete mode, the circuit is configured to delete a passcode to be deleted from existing passcodes stored in memory without specifying a user slot.

In some embodiments, the circuit is configured to search existing passcodes stored in memory to determine whether the new passcode is a duplicate of any existing passcodes in the add mode. For example, the circuit could be configured to store the new passcode in memory as an authorized passcode if the new passcode is not a duplicate of any existing passcodes. If it is a duplicate, the circuit would reject the new passcode, such as with an audible and/or visual indication. In some cases, the circuit may be configured to search for an available user slot for which no authorized passcodes are associated and associate the new passcode with an available user slot. Once the new passcode is associated with an available user slot, the circuit is configured to move the bolt from the locked position to the unlocked position responsive to entering the new passcode via the input device.

In some embodiments, the circuit is configured to search existing passcodes stored in memory to determine whether the passcode to be deleted matches any existing passcodes when in the delete mode. For example, the circuit could be configured to delete the passcode to be deleted from memory as an authorized passcode if the passcode to be deleted matches an existing passcode. However, if the passcode to be deleted does not match an existing passcode stored in memory, the circuit would reject the passcode.

According to a further aspect, the invention provides an electronic lock with a latch assembly including a bolt movable between a locked position and an unlocked position. A circuit is provided that includes at least one input device and memory. The memory has a plurality of user slots stored thereon that are capable of being associated with an authorized passcode. The circuit controls movement of the bolt from the locked position to the unlocked position responsive to receiving an authorized passcode via the input device. The circuit can enter an add mode responsive to input received from the input device. When in the add mode, the circuit is configured to associate a new passcode entered via the input device with one of the plurality of user slots by determining whether a new passcode is unique compared to existing passcodes stored in memory. If the new passcode is not unique compared to existing passcodes stored in memory, the circuit is configured to reject the new passcode. However, if the new passcode is unique compared to existing passcodes stored in memory, the circuit is configured to search for an available user slot for which no authorized passcodes are associated and associate the new passcode with the available user slot.

According to yet another aspect, the invention provides a method of updating an electronic lock. The method includes the step of entering into an add mode responsive to receiving input from an input device associated with an electronic lock. The electronic lock includes memory having a plurality of user slots stored thereon that can be associated with authorized passcodes that are capable of unlocking the electronic lock. A new passcode to be added as an authorized passcode for the electronic lock is received via the input device. The new passcode is automatically assigned to an available user slot of the plurality of user slots stored in memory without receiving an identification of a user slot from the input device. Upon assignment of the new passcode to the available user slot, the new passcode acts as an authorized passcode to unlock the electronic lock.

Additional features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF THE DRAWINGS

Figure 1A:
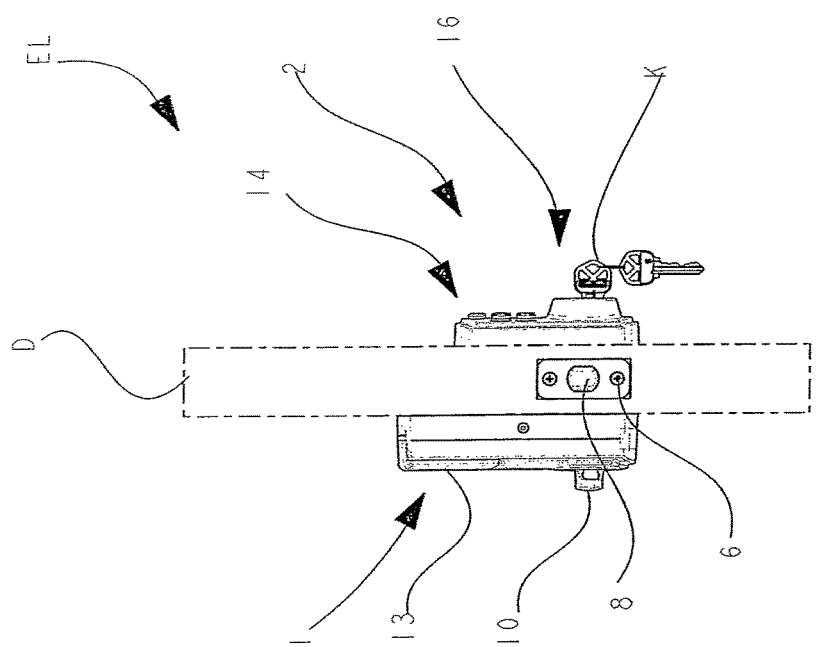
FIG. 1A is a side view of an electronic lock in accordance with an embodiment of the present invention, installed on a door and with the door show in phantom lines.
Figure 1B:
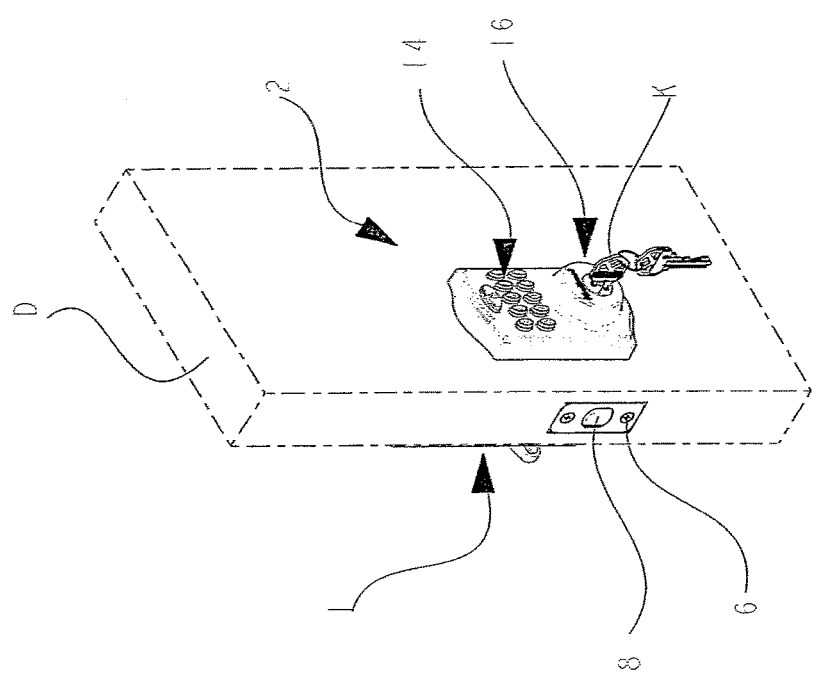
FIG. 1B is a perspective view of the electronic lock of FIG. 1A, as viewed from the exterior of the door.
Figure 1C:
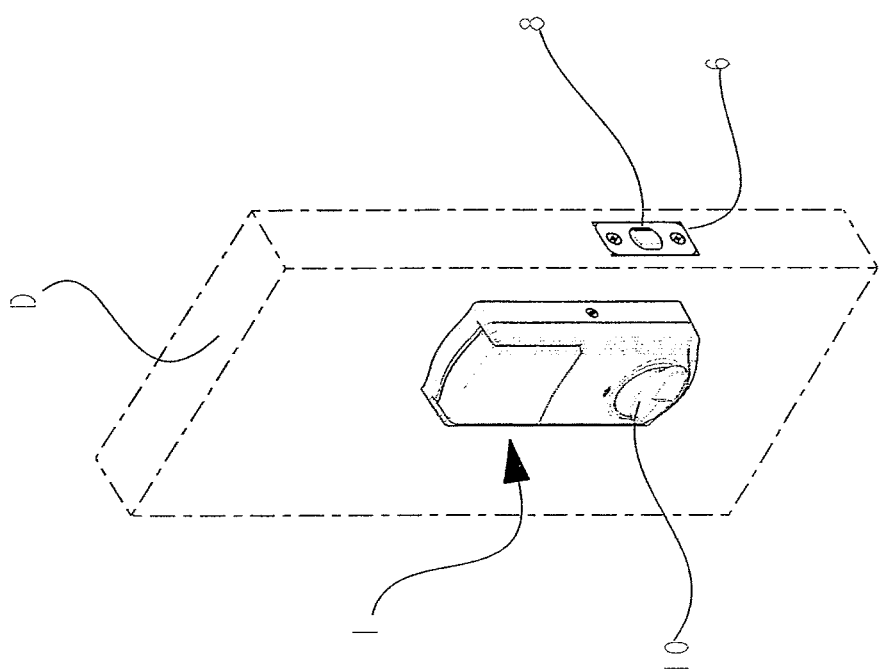
FIG. 1C is a perspective view of the electronic lock of FIG. 1A as viewed from the interior of the door.

Referring now to the drawings and particularly to FIGS. 1A-1C and 2, there is shown an electronic lock (EL) in accordance with an embodiment of the present invention for mounting on a door D, and which includes an interior chassis 1, an exterior chassis 2, a mounting plate 3, an adapter 4, a latch assembly 5, and a strike 6.

Figure 2:
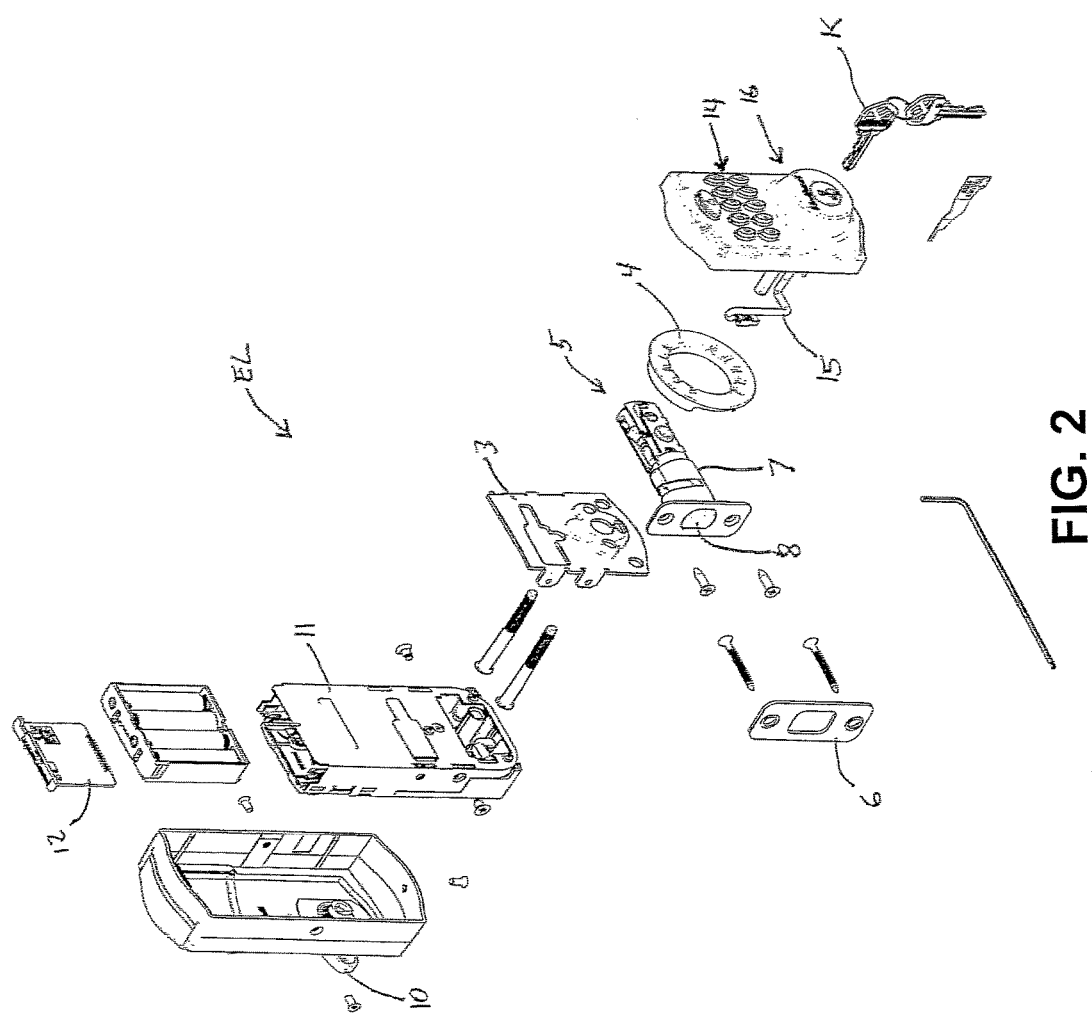
FIG. 2 is an exploded view of the electronic lock of FIGS. 1A-1C.

As shown in FIG. 2, latch assembly 5 is of a configuration well known in the art, and includes a bolt actuator mechanism 7, and a bolt 8. Mounting plate 3 is used to mount the electronic lock to the door D. Adapter 4 is used to adapt the electronic lock to a particular hole opening in the door D. Although a deadbolt is shown for purposes of example, the manner by which passcode can be added and deleted is equally applicable to other types of electronic locks, such as levers.

Figure 3:
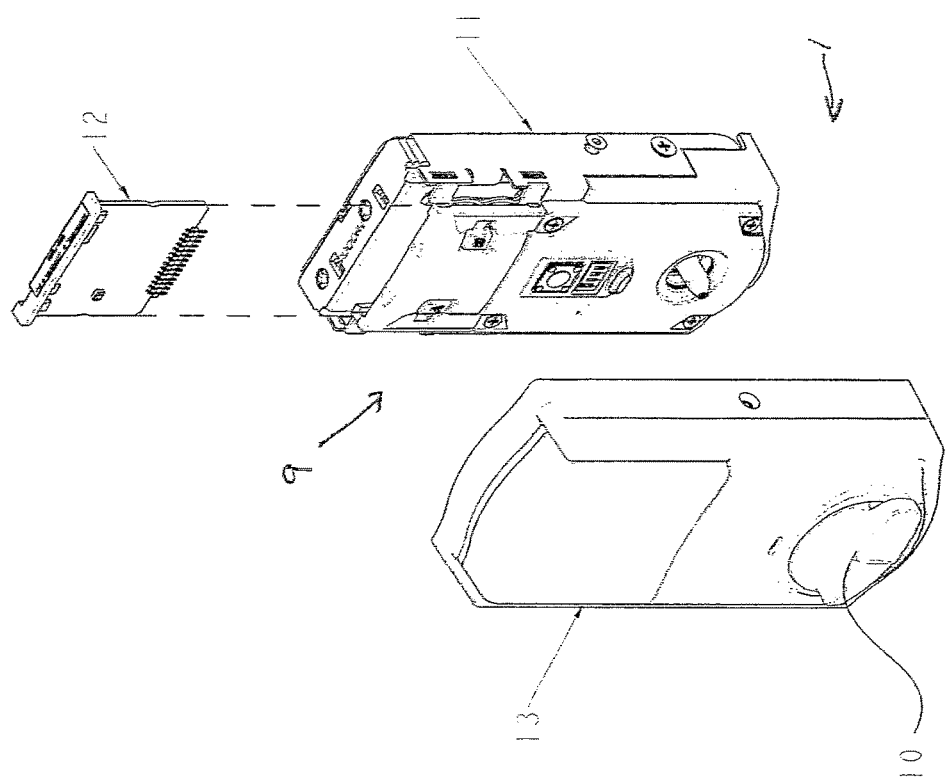
FIG. 3 is a perspective view of the interior chassis of the electronic lock of FIG. 2, with the upper cover and daughter card removed.

Referring also to FIG. 3, interior chassis 1 includes the electronics circuitry 9 for the electronic lock, and further includes a manual turnpiece 10. Manual turnpiece 10 is used on the interior side of door D to operate the bolt actuator mechanism 7 of latch assembly 5, and in turn to extend and retract bolt 8 (see also FIG. 1C). In this example, the electronics circuitry 9 includes a base board 11 and an optional daughter card 12. In FIG. 3, a removable cover 13 is provided to cover over the base board 11 and daughter card 12, when cover 13 is in the installed position. The optional daughter card 12 is a wireless communications module that facilitates wireless communications with an external device though a desired wireless communications protocol, e.g., Zigbee, Z-wave, etc.

Referring again to FIG. 2, exterior chassis 2 includes a keypad 14 for receiving a user input. Keypad 14 is electrically connected to the base board 11 of electronics circuitry 9, such as for example by an electrical cable 15. When the user inputs a valid passcode via keypad 14 that is recognized by the electronics circuitry 9, an electrical motor (not show) is energized to retract the bolt 8 of latch assembly 5, thus permitting door D (see FIG. 1B) to be opened from a closed position. Although this example shows a keypad 14 with physical keys, one skilled in the art should appreciate that the keypad could be displayed on a touchscreen or be comprised of one or more soft keys. Alternatively, a key actuator 16, having a removable key K, is provided for manually operating latch assembly 5 from the exterior of the door D.

The EL includes a plurality of user slots to which passcodes can be assigned or associated. Consider an example in which the EL includes four user slots: user slot 1, user slot 2, user slot 3, and user slot 4. One skilled in the art should appreciate that more or less than four user slots could be provided depending on the circumstances. In this example, user slot 1 is associated with passcode "1234," user slot 2 is associated with passcode "6789," and user slots 3 and 4 are not currently assigned to any passcode. With this example, a user could enter either "1234" or "6789" to unlock the EL.

Figure 4:
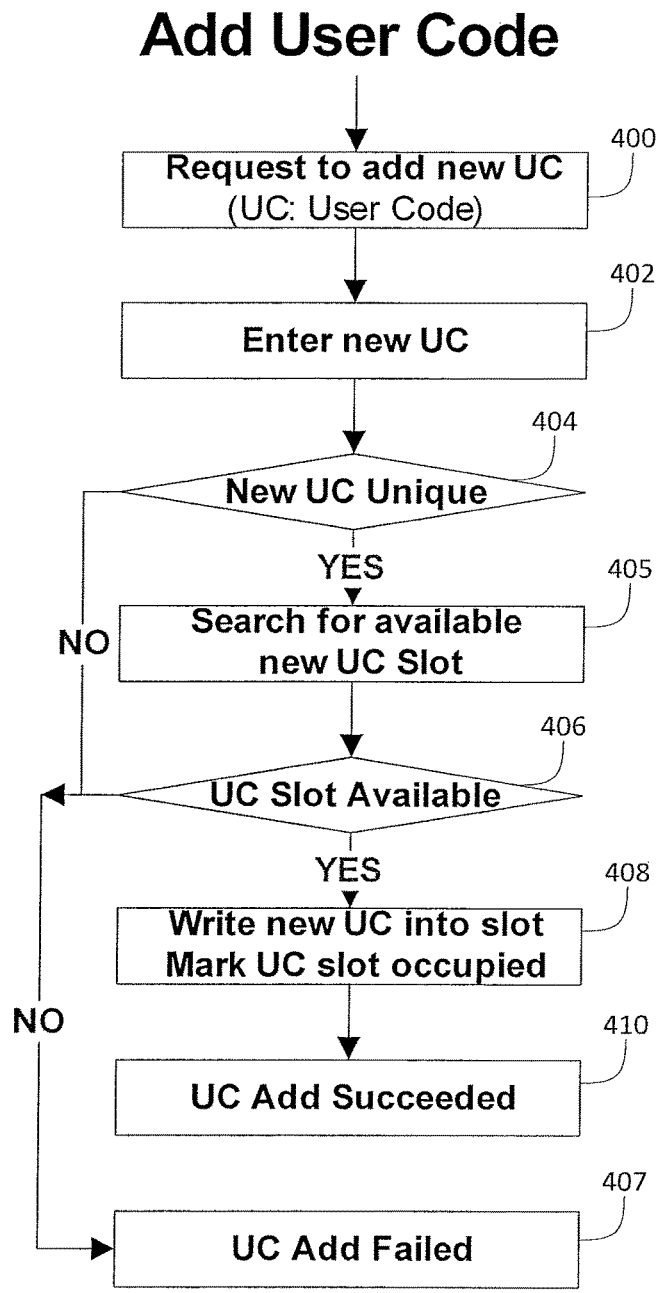
FIG. 4 is a flow chart showing an example method by which an additional passcode could be added to the electronic lock.

If a user desires to add an additional passcode to the EL, this can be done without requiring the user to enter a user slot number to which the new passcode will be assigned. The EL is programmed such that the user slot number with which the new passcode is associated is automatically assigned. FIG. 4 shows an example process that the EL could be programmed to perform to add a new passcode. In this embodiment, the user requests a new passcode (also called a user code or UC) be added (block 400). This request could be initiated in a variety of manners. For example, the "add" mode could be initiated by entering a special programming code into the keypad. By way of another example, the "add" mode could be entered by selecting a specific key on the keypad, such as a dedicated "add" key.

In whatever manner by which the "add" mode is initiated, the user would next enter the new passcode (block 402). The EL is programmed to detect whether the new passcode is unique or not (block 404). For example, the EL could be programmed to search each of the user slots to determine whether any are associated with the password entered by the user (block 405). If the passcode has already been used, the EL will not enter the same password again (block 407). The user could be provided with an indication that the passcode cannot be added, such as an audible sound or a visual indication, such as a light flashing, or other manner by which the user could be alerted that the passcode was not entered. If, in the above example, the user attempts to add the passcode "1234," this would be denied because this passcode is already associated with user slot number 1. Likewise, in the above example, if the user attempted to add the passcode "6789," this would be denied because this passcode is already associated with user slot number 2.

If the passcode is unique, however, the EL will search for a user slot that is not associated with a passcode (block 406). If all user slots are already associated with passcodes, the user will not be allowed to add another passcode (block 407). As discussed above, the user could be provided with an audible and/or visual indication that the new passcode could not be entered. If the search reveals an unassociated or empty user slot, the new password will be associated with the user slot (block 408), which means the addition of the new passcode is successful (block 410). This means that the new passcode will be now recognized by the electronics circuitry 9 as a valid passcode for unlocking the EL. If, in the above example, the user entered "4567" as the new passcode, this could be assigned to user slot number 3, which would allow the passcode "4567" to now unlock the EL.

Figure 5:
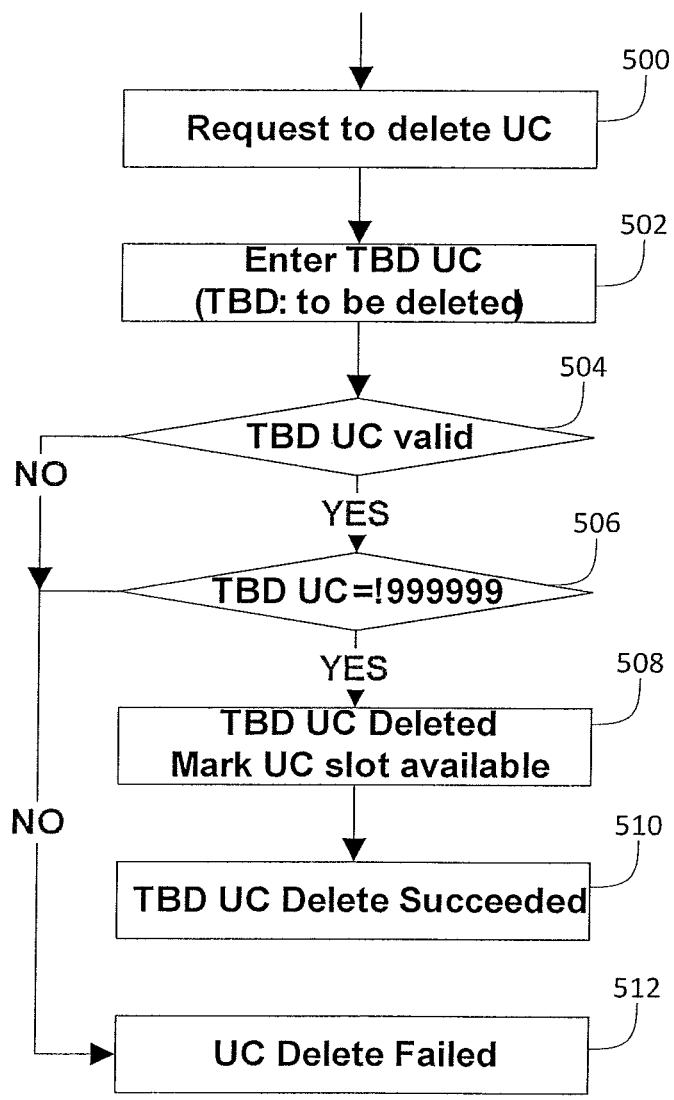
FIG. 5 is a flow chart showing an example method by which a passcode could be deleted from the electronic lock.

If the user desires to delete a passcode from the EL, this can also be done without requiring the user to enter a user slot number. The EL is programmed such that the user slot number is not entered at all when deleting a passcode. FIG. 5 shows an example process that the EL could be programmed to perform to delete a passcode. In this embodiment, the user requests that a passcode be deleted (block 500). For example, the user could enter the "delete" mode by typing in a special programming sequence associated with the delete mode. By way of another example, the EL could have a dedicated "delete" button on the keypad. In any event, the user would enter the passcode to be deleted (block 502). The EL could be programmed to determine whether the passcode entered by the user is valid (block 504) and not a special code (block 506). If not, the deletion of the passcode failed (block 512). If, in the above example, the user entered the passcode "7654," which is not associated with any of the user slots, the circuitry 9 would indicate to the user that the passcode deletion failed. The user could be provided an audible and/or visual indication that the deletion was not successful. If the passcode is deemed to be a valid passcode, the user slot associated with the passcode entered by the user is deleted and the user slot is marked as available (block 508). This means the deletion of the passcode has succeeded (block 510) and will no longer be recognized by the circuitry 9 to unlock the EL. If in the above example, the user entered the passcode "1234" for deletion, the circuitry 9 would recognize this is a valid passcode associated with user slot number 1 and delete this passcode so user slot number 1 would no longer be associated with any passcode.

While this invention has been described with respect to an embodiment of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An electronic lock comprising:
   a latch assembly including a bolt movable between a locked position and an unlocked position;
   a circuit including at least one input device and memory;
   wherein the memory has a plurality of user slots stored thereon that are capable of being associated with an authorized passcode;
   wherein the circuit is configured to control movement of the bolt from the locked position to the unlocked position responsive to receiving an authorized passcode via the input device;
   wherein the circuit is configured to enter into an add mode responsive to input received from the input device; wherein in the add mode the circuit is configured to add a new passcode to memory without specifying a user slot;
   wherein in the add mode, the circuit is configured to search existing passcodes stored in memory to determine whether the new passcode is a duplicate of any existing passcodes;
   wherein in the add mode, the circuit is configured to store the new passcode in memory as an authorized passcode if the new passcode is not a duplicate of any existing passcodes; and
   wherein the circuit is configured to enter into a delete mode responsive to input received from the input device; wherein in the delete mode the circuit is configured to delete a passcode to be deleted from existing passcodes stored in memory without specifying a user slot.

2. The electronic lock as recited in claim 1, wherein the circuit is configured to search for an available user slot for which no authorized passcodes are associated and associate the new passcode with an available user slot.

3. The electronic lock as recited in claim 2, wherein the circuit is configured to move the bolt from the locked position to the unlocked position responsive to entering the new passcode via the input device.

4. The electronic lock as recited in claim 1, wherein the circuit is configured to reject the new passcode if the new passcode is a duplicate of an existing passcode.

5. The electronic lock as recited in claim 4, wherein the circuit is configured to communicate an audible and/or visual indication that the new passcode has been rejected.

6. The electronic lock as recited in claim 1, wherein in the delete mode, the circuit is configured to search existing passcodes stored in memory to determine whether the passcode to be deleted matches any existing passcodes.

7. The electronic lock as recited in claim 6, wherein the circuit is configured to delete the passcode to be deleted from memory as an authorized passcode if the passcode to be deleted matches an existing passcode.

8. The electronic lock as recited in claim 7, wherein the circuit is configured to reject the passcode to be deleted if the passcode to be deleted does not match an existing passcode stored in memory.

9. The electronic lock as recited in claim 8, wherein the circuit is configured to communicate an audible and/or visual indication that the passcode to be deleted has been rejected.

* * * * *